Feb. 21, 1933. J. H. TREECE 1,898,407
SHEAR MECHANISM FOR GLASSWARE FORMING MACHINES
Filed Jan. 17, 1930
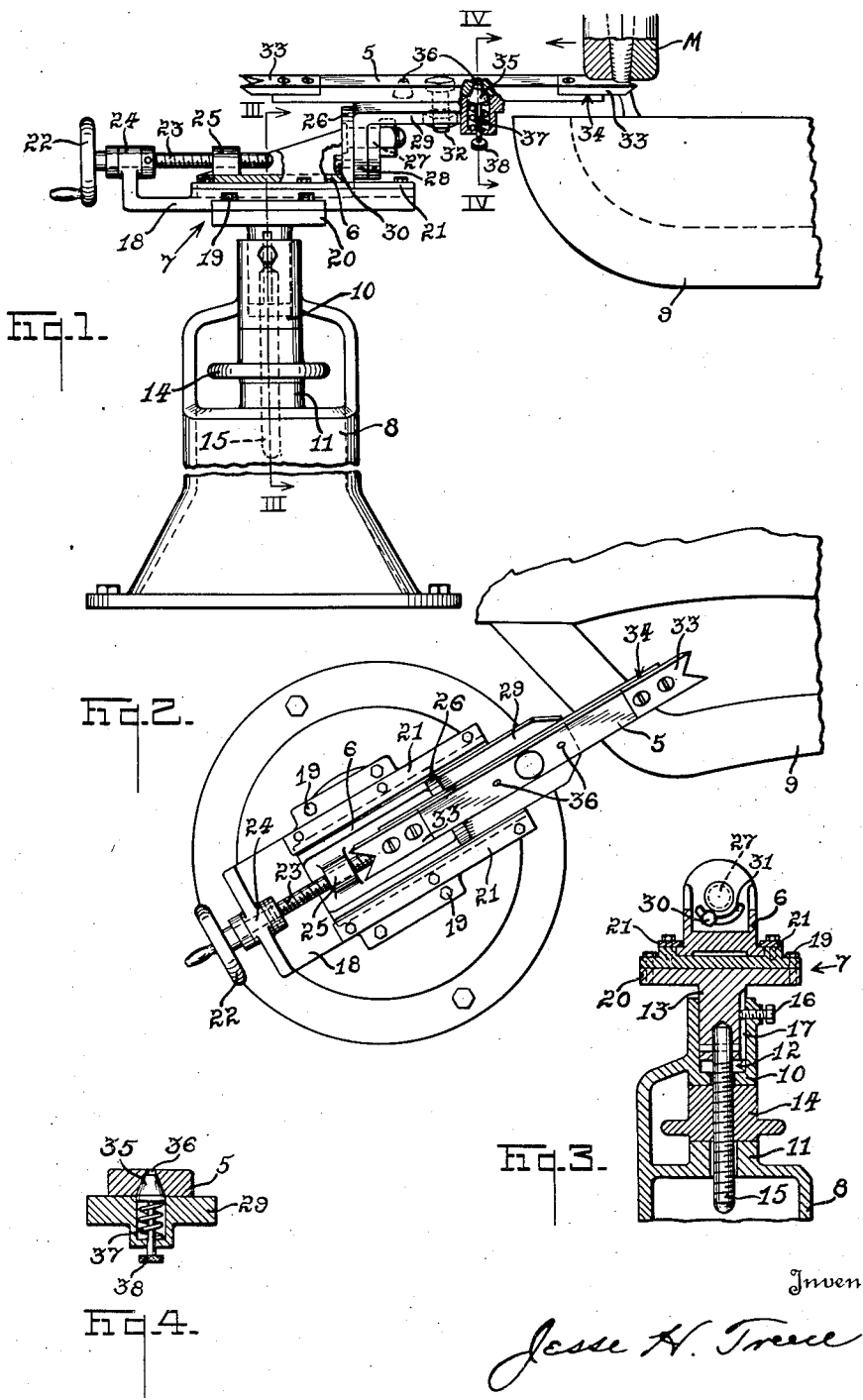
Inventor
Jesse H. Treece
By J. F. Rule
Attorney Patented Feb. 21, 1933

1,898,407

UNITED STATES PATENT OFFICE

JESSE H. TREECE, OF TOLEDO, OHIO, ASSIGNOR TO OWENS-ILLINOIS GLASS COMPANY, A CORPORATION OF OHIO

SHEAR MECHANISM FOR GLASSWARE FORMING MACHINES

Application filed January 17, 1930. Serial No. 421,379.

The present invention relates to improvements in shear mechanism for glassware forming machines and more particularly that type of mechanism adapted for use in connection with suction gathering molds.

In some types of commercial glassware forming machines, the charge gathering or blank molds are arranged in a series mounted for movement in succession in contact with the surface of a supply body of molten glass from which mold charges are gathered by suction. Upon completion of the charge gathering operation, these molds are lifted out of the glass and immediately slidingly contact with a cutoff knife which shears the excess glass from the mold charges which have been gathered into the mold cavities. Because the shear mechanism is common to all of the gathering molds, the cutting blade or knife is subject to considerable wear and must be changed frequently in order that satisfactory severance of the mold charges from the supply body may be obtained.

An object of the present invention is the provision of an improved shear mechanism of the above character in which the cutting blade may be replaced with comparative ease and without interrupting normal operation of the glassware forming machine.

Another object is the provision of a blade carrier upon which two or more blades may be mounted, said carrier being readily movable to operatively position any one of the blades. Thus, when one blade becomes dull or broken, the carrier may be moved to bring a new blade into cutting position and the dull or broken blade replaced by a new or sharpened one.

Another object is the provision of shear mechanism of the above character in which the angular position of the blade may be varied as required by the angular position of the blank mold as it approaches the shear mechanism.

A further object is the provision of adjusting means whereby the blade may be set in various positions to thereby advance or retard the point at which the mold charges are severed from the supply body of glass.

Other objects will be in part apparent and in part pointed out hereinafter.

In the drawing:

Fig. 1 is a part sectional side elevation of an apparatus embodying my invention.

Fig. 2 is a plan view of the same.

Fig. 3 is a sectional view taken substantially along the line III—III of Fig. 1.

Fig. 4 is a sectional view taken along the line IV—IV of Fig. 1.

In more or less general terms, the shear mechanism comprises a blade holder 5 mounted on a slide 6 which adjustably connects said holder 5 and a carrier 7, the latter mounted for vertical adjustment on a stationary base 8 or pedestal. The blade holder is adjustably connected to the slide 6 so that the angular position of the cutting blade or knife 33 may be adjusted as required by the position of the gathering mold as it approaches the charge severing position. The slide 6 is adjustably connected to the carrier 7 so that the cutting blade may be adjusted horizontally relative to the container 9 for molten glass and thereby advance or retard the charge severing positions to suit operating conditions. Vertical adjustment of the entire mechanism relative to the base 8 or pedestal compensates for variations in length of the gathering molds.

The base 8 is provided with a pair of vertically spaced upper and lower bearings 10 and 11, the upper bearing having a counterbore 12 opening upwardly to receive a depending extension 13 on the carrier 7. An adjusting hand wheel 14 for raising or lowering the shear mechanism in its entirety, is disposed between the bearings 10 and 11 and is threaded onto a rod 15 extending vertically through said bearings and non-rotatively connected at its upper end to said extension 13. A screw 16 mounted in the upper bearing 10 projects into a keyway 17 in the extension 13, preventing rotary movement of the extension 13 and carrier 7 when the hand wheel 14 is rotated to vary elevation of said carrier and parts supported thereon.

The carrier 7 comprises a base plate 18 connected by bolts 19 to a sub-base 20 from which said extension 13 depends. The base plate 18 is formed with a slideway 21 in its upper side in which the slide 6 is mounted for adjustment in a horizontal plane toward and from the container 9, such adjustment changing the charge severing point, as stated above. Adjustment of the slide 6 is obtained by rotation of a hand wheel 22 carried by an adjusting screw 23 which is suitably mounted in a bearing 24 and has one end threaded in a boss 25 extending upwardly from the slide 6.

The slide 6 upon which the blade holder 5 is adjustably and reversably mounted is provided at one end with an upstanding flange 26 which is pivoted through a hinge pin 27 to a depending flange 28 on a bearing plate 29 having direct connection to the blade holder 5. A lock screw 30 carried by the depending flange 27 and extending through an arcuate slot 31 in the upstanding flange 26 of the slide 6 provides means whereby the bearing plate 29 to which the blade holder 5 is attached, may be angularly adjusted and securely held in such adjusted position as may correspond to the inclination of the molds at the charge severing position.

The blade holder 5 comprises an elongated bar pivoted through a vertical hinge pin 32 to the horizontally extending bearing plate 29. Cutters or blades 33 may be set into recesses 34 formed in the opposite ends of said holder. For the purpose of releasably securing the holder 5 in position to locate one of the blades in the path of travel of a gathering mold "M", a spring pressed detent 35 is mounted in the bearing plate 29. This detent is yieldingly projected into one of a pair of recesses 36 in the holder 5 by means of a spring 37. A finger piece 38 provides convenient means for releasing the holder 5 from the influence of said detent when said holder is to be rotated for removing one of the blades 33 from its operating position.

The carrier 7 is adjusted to the proper elevation to permit shearing of excess glass from the blank molds by one of the blades 33, such adjustment being obtained by manual rotation of the hand wheel 14. Adjustment of the active blade 33 horizontally relative to the container 9 for molten glass, so that excess glass is severed from the molds "M" at the proper point, is obtained by rotation of the hand wheel 22 which moves the slide 6 horizontally relative to the carrier 7. Angular adjustment of the blade 33 so that it will properly contact with the lower ends of the molds "M" at the charge severing position, is obtained by loosening the screw 30 and adjusting the bearing plate 29 and holder 5 about the axis of the hinge pin 27 and then tightening the screw 30. When it becomes necessary to replace a knife or blade 33 at the operating position, the detent 35 is withdrawn and the holder 5 moved 180° about the axis of the hinge pin 32. The detent is then released and projects into the second recess 36, thereby positively holding the new blade 33 in operating position. These blades 33 are shown separably attached to the holder 5 so that they may be completely removed from the holder for sharpening or replacement.

Modifications may be resorted to within the spirit and scope of the appended claims.

What I claim is:

1. In a shear mechanism, the combination of a stationary blade holder, a cutting blade thereon, a stationary bearing plate, means providing an adjustable connection between the blade holder and said plate whereby the holder may be manually adjusted to place the cutting blade in a charge severing position, means for locking said holder in its adjusted position relative to the bearing plate, a support for the bearing plate and holder, means providing a horizontal pivotal connection between said support and bearing plate permitting rotative adjustment of the bearing plate and blade holder about a horizontal axis, and means for securing the bearing plate in its adjusted position.

2. In shear mechanism, the combination of a base member, a slide mounted for horizontal movement on the base member, a bearing plate pivoted to the slide for adjustment about a horizontal axis, means for securing the bearing plate in its adjusted position on the slide, a blade holder, a cutting blade on said holder, said blade holder pivoted to the bearing plate for movement in a substantially horizontal plane relative to the bearing plate to thereby bring the blade to an operating position, and means for securing the blade holder to the bearing plate in said position in which the blade is in said operating position and holding the blade holder in said position throughout the normal operation of the shear mechanism until manually adjusted to a different position.

3. In shear mechanism, the combination of a base member, a slide mounted for horizontal movement on the base member, a bearing plate pivoted to the slide for adjustment about a horizontal axis, means for securing the bearing plate in its adjusted position on the slide, a blade holder, a cutting blade on said holder, said blade holder pivoted to the bearing plate for movement in a substantially horizontal plane relative to the bearing plate to thereby bring the blade to an operating position, means for securing the blade holder to the bearing plate in a position in which the blade is in said operating position and holding the blade holder in said position throughout the normal operation of the shear mechanism until manually adjusted to a different position, and manually controlled means for moving the slide, bearing plate, and blade holder as a unit in a horizontal plane to thereby adjust the operating position.

4. In shear mechanism, the combination of a base member, a slide mounted for horizontal movement on the base member, a bearing plate pivoted to the slide for adjustment about a horizontal axis, means for securing the bearing plate in its adjusted position on the slide, a blade holder, a cutting blade on said holder, said blade holder pivoted to the bearing plate for movement in a substantially horizontal plane relative to the bearing plate to thereby bring the blade to an operating position, means for securing the blade holder to the bearing plate in said operating position and holding the blade holder in said position throughout the normal operation of the shear mechanism until manually adjusted to a different position, manually controlled means for moving the slide, bearing plate, and blade holder as a unit in a horizontal plane to thereby adjust the operating position, and manually controlled means for changing the elevation of said slide, bearing plate, and blade holder.

5. The combination of a support, a bearing plate pivoted to the support for adjustable swinging movement about a horizontal axis, means for securing the bearing plate to the support in its adjusted position, a blade holder pivoted to the bearing plate for swinging movement in a substantially horizontal plane, a cutting blade on said holder brought into or out of operative position by said swinging movement of the blade holder, and a holding device for releasably securing the holder in any of said adjusted positions and thereby holding the cutting blade in either position, said holding device comprising a spring pressed detent carried by the bearing plate, said blade holder having recesses arranged to receive said detent.

6. The combination of a stationary base, a carrier supported thereon, means for adjusting the carrier up and down relative to said base and holding it in adjusted position, a slide mounted on the carrier, means for adjusting the slide horizontally on the carrier, a horizontally disposed bearing plate supported on said slide and adjustable relative thereto about a horizontal axis, means for securing the bearing plate in its adjusted position, a blade holder comprising a horizontally disposed bar pivoted intermediate its ends to said bearing plate for movement about a substantially vertical axis, a cutter blade mounted on said bar at one end thereof and brought alternatively to an operative or inoperative position by said pivotal movement of the bar, and a manually operable spring detent releasably locking the blade holder to the bearing plate and capable of holding it in either position.

7. Shear mechanism including, in combination, a stationary blade holder having one end thereof adapted to project over a tank containing molten glass, a blade held in fixed position on said end of the holder, a support, means for pivotally mounting the blade holder on said support for angular adjustment to change the angle of inclination of the blade, and means for adjusting said support horizontally to vary the extent to which the blade is projected over the tank.

Signed at Toledo, Ohio, this 15th day of January, 1930.

JESSE H. TREECE.